(12) United States Patent
Hosier et al.

(10) Patent No.: US 8,208,684 B2
(45) Date of Patent: Jun. 26, 2012

(54) IMAGE DATA COMPENSATION FOR OPTICAL OR SPATIAL ERROR IN AN ARRAY OF PHOTOSENSITIVE CHIPS

(75) Inventors: Paul A. Hosier, Rochester, NY (US); Martin Edward Banton, Fairport, NY (US); Frederick O. Hayes, III, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 565 days.

(21) Appl. No.: 12/497,341

(22) Filed: Jul. 2, 2009

(65) Prior Publication Data
US 2011/0002502 A1 Jan. 6, 2011

(51) Int. Cl.
*G06K 9/00* (2006.01)
*H01L 27/00* (2006.01)
*H04N 1/46* (2006.01)

(52) U.S. Cl. .................. 382/100; 250/208.1; 358/514

(58) Field of Classification Search .................. 382/100, 382/193, 312, 314, 317, 318, 319; 348/96, 348/97, 195, 201, 206, 210.99; 358/483, 358/505, 514; 250/208.1, 208.3, 334; 712/32
See application file for complete search history.

(56) References Cited

U.S. PATENT DOCUMENTS

| | | | | |
|---|---|---|---|---|
| 5,219,796 A | * | 6/1993 | Quinn et al. | 438/68 |
| 5,550,653 A | * | 8/1996 | TeWinkle et al. | 358/514 |
| 6,610,972 B2 | | 8/2003 | Perregaux | |
| 6,707,022 B2 | * | 3/2004 | Perregaux | 250/208.1 |

* cited by examiner

*Primary Examiner* — Abolfazl Tabatabai
(74) *Attorney, Agent, or Firm* — Simpson & Simpson, PLLC

(57) ABSTRACT

A method of processing image data from a multi-chip array with a plurality of photosensitive chips aligned substantially in a transverse direction, including: generating, using a processor for at least one specially programmed computer, a $\Delta y$ or $\Delta x$ optical error value equal to a difference in process and transverse directions, respectively, between actual and apparent locations for a first photosensor, the apparent location due to optical error; and storing, in a memory element for the specially programmed computer, respective outputs from the photosensors in the array for first and second scan lines. The actual location is included in the first scan line. The processor retrieves, for use as at least part of useful image data for the first photosensor, the stored output of: the first photosensor for the second scan line for a $\Delta y$ optical error, or a second photosensor for the first line for a $\Delta x$ optical error.

19 Claims, 3 Drawing Sheets

IMAGE DATA COMPENSATION FOR OPTICAL OR SPATIAL ERROR IN AN ARRAY OF PHOTOSENSITIVE CHIPS

TECHNICAL FIELD

The present disclosure relates to compensation of image data for an array of photosensitive chips, for example, a full width array sensor, due to optical or spatial errors.

BACKGROUND

Multi-chip arrays are used in many image-reading applications, either for scanning in original images on paper, or for monitoring the detailed real-time behavior of a printing system, such as by recording images created on a photoreceptor, intermediate belt, offset member, or on print sheets or printed webs.

SUMMARY

According to aspects illustrated herein, there is provided a method of processing image data from a multi-chip array, the array including a plurality of photosensitive chips placed end to end substantially in a transverse direction, each chip in the plurality of chips including a respective row of photosensors aligned in an x direction between respective ends for said each chip, including: generating, using a processor for at least one specially programmed computer, a $\Delta x$ optical error value substantially equal to a difference in the transverse direction, between an apparent location for a first photosensor and an actual location for the first photosensor, the apparent location due to optical error; storing, in a memory element for the at least one specially programmed computer, respective outputs from the photosensors in the array for at least one scan line, the apparent location included in the at least one scan line; and retrieving, using the processor, a stored output for a second photosensor included in the at least one scan line for use as at least part of useful image data for the first photosensor, a portion of the second photosensor disposed, in the transverse direction, a distance approximately equal to the $\Delta x$ optical error value, from the first photosensor.

According to aspects illustrated herein, there is provided a method of processing image data from a multi-chip array, the array including a plurality of photosensitive chips placed end to end substantially in a traverse direction, each chip in the plurality of chips including a respective row of photosensors aligned in an x direction between respective ends for said each chip, including: generating, using a processor for at least one specially programmed computer, a $\Delta y$ optical error value substantially equal to a difference in a process direction, orthogonal to the transverse direction, between an actual location for a first photosensor and an apparent location for the first photosensor, the apparent location due to optical error; and storing, in a memory element for the at least one specially programmed computer, respective outputs from the photosensors in the array for first and second scan lines. The actual location is included in the first scan line. The processor retrieves the stored output of the first photosensor for the second scan line for use as at least part of useful image data for the first photosensor. The choice of which first and second lines are used for correction with respect to a reference line is related to the $\Delta y$ optical error value.

According to aspects illustrated herein, there is provided a method of processing image data from a multi-chip array, the array including a plurality of photosensitive chips placed end to end in sequence substantially in a transverse direction starting with a first chip, and forming respective gaps between adjacent pairs of chips, and each chip in the plurality of chips including a respective row of photosensors aligned in an x direction between respective longitudinal ends for said each chip, including: generating, using a processor for at least one specially programmed computer, a cumulative $\Delta y$ spatial error value by summing respective $\Delta y$ spatial error values for each gap between a chip including a photosensor and the first chip in the sequence, a $\Delta y$ spatial error value for a gap substantially equal to a difference in a process direction, orthogonal to the transverse direction, between respective desired positions for chips adjacent the gap and respective actual positions between the chips adjacent the gap; storing, in a memory element for the at least one specially programmed computer, respective outputs for the photosensors in the array for first and second scan lines. At least a portion of a location of the photosensor in the chip in the desired position is included in the first scan line. The processor retrieves a stored output of the photosensor for the second scan line for use as at least part of useful image data for the first photosensor. The choice of which first and second lines are used for correction with respect to a reference line is related to the cumulative $\Delta y$ spatial error value.

According to aspects illustrated herein, there is provided a method of processing image data from a multi-chip array, the array including a plurality of photosensitive chips placed end to end in sequence substantially in a transverse direction starting with a first chip, and forming respective gaps between adjacent pairs of chips, and each chip in the plurality of chips including a respective row of photosensors aligned in an x direction between respective longitudinal ends for said each chip, including: generating, using a processor for the at least one specially programmed computer, a cumulative error value for a first photosensor, the cumulative error value including respective differences in the transverse direction and in a process direction, orthogonal to the transverse direction, with respect to a reference point in the array and a location of the first photosensor, the location related to optical error or to spatial error in placement of a chip including the first photosensor; storing, in a memory element for the at least one specially programmed computer, respective outputs from the photosensors in the array for first and second scan lines. The desired location of the first photosensor is included in the first scan and a choice of which first and second lines are used for correction with respect to a reference line is related to the cumulative error value. The processor retrieves, for use as at least part of useful image data for the first photosensor: a stored output of the first photosensor for the second scan line; or a stored output of a second photosensor for the first or second scan line.

According to aspects illustrated herein, there is provided an apparatus for generating or reproducing a document, including: a multi-chip array, the array including a plurality of photosensitive chips placed end to end in substantially a transverse direction, each chip in the plurality of chips including a respective row of photosensors aligned in an x direction between respective ends for said each chip; a processor for at least one specially programmed computer for generating a cumulative error value for a first photosensor in the array, the cumulative error value including respective differences in the transverse direction and in a process direction, orthogonal to the transverse direction, between a reference point in the array and a location of the first photosensor, the location related to optical error or to spatial error in placement of a chip including the first photosensor; and a memory element for the at least one specially programmed computer for storing respective outputs for the first photosensor and a second photosensor in the array. The first and second photosensors are in first and second scan lines, respectively, and a choice of which first and second lines are used for correction with respect to a reference line is related to the cumulative error value. The processor is for retrieving, for use as at least part of useful image data for the first photosensor: a stored output of the first photosensor for the second scan line; or a stored output of the second photosensor for the first or second scan line.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 3:
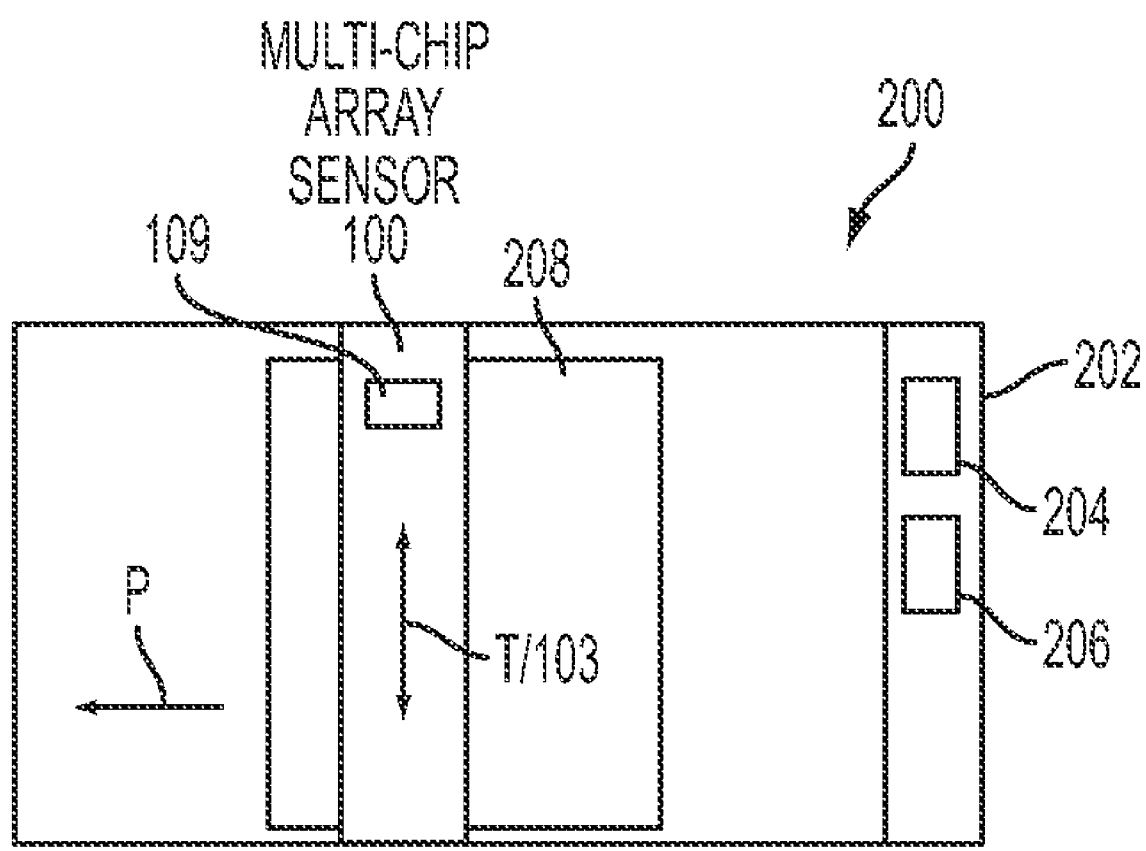
FIG. 3 is a block diagram of an apparatus with multi-chip array sensor and for providing imaging data compensation for optical or spatial placement errors in the sensor.

FIG. 3 is a block diagram of an apparatus with a multi-chip array sensor with one chip shown. The apparatus can be a digital scanner, copier, facsimile machine, or other document generating or reproducing device. It is desirable to align the chips in the sensor in transverse direction T, orthogonal to process direction P and to have specific spacing between the chips; however, in practice the actual locations of the chips can deviate from the desired alignment and spacing as further described infra.

In an example embodiment, apparatus 200 is a digital scanner, copier, facsimile machine, or other document generating or reproducing device. Apparatus 200 includes specially at least one programmed computer 202 with processor 204 and memory element 206. Computer 202, processor 204, and memory element 206 can be any computer, processor, or memory element known in the art.

According to aspects illustrated herein, there is provided methods of processing image data from a multi-chip array. Apparatus 200 is used to describe the methods. However, it should be understood that implementation of the method is not limited to the configuration shown for apparatus 200. In apparatus 200, sensor 100, described infra, moves in direction P, orthogonal to direction T, with respect to sheet of material 208 to gather imaging data from the sheet.

Figure 1:
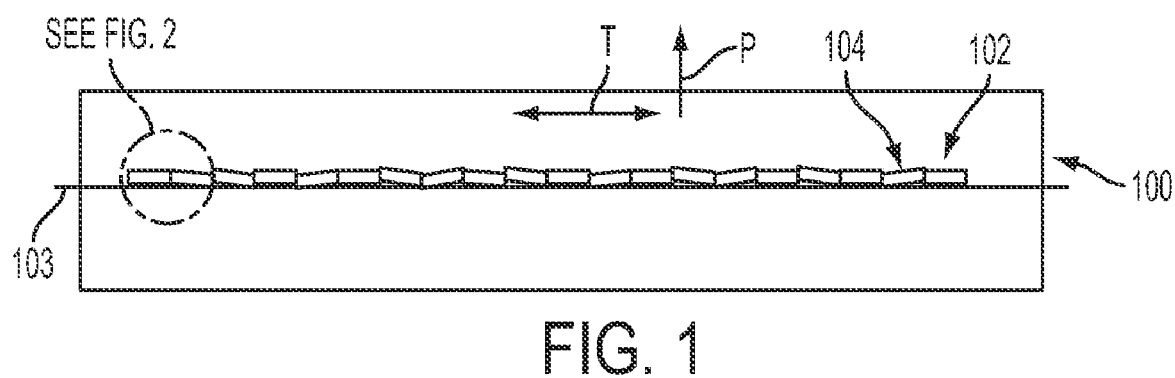
FIG. 1 is a plan view of a multi-chip array sensor showing spatial placement errors for chips in the array.

FIG. 1 is a plan view of multi-chip array sensor 100 showing spatial placement errors for chips 102 in the array. In an example embodiment, sensor 100 is a full width array sensor. Full width array sensor 100 includes a plurality of photosensitive chips placed end to end generally in direction T. Ideally, chips 102 would be aligned with transverse direction T, which is parallel to chip alignment axis 103 for the array, and evenly spaced with respect to direction T. However, in practice, at least some of chips 102 are improperly placed with respect to one or all of axis 103 or directions P or T, resulting in spatial placement error for the chips. Such improper placement is shown in an exemplary fashion in FIG. 1. It should be understood that FIG. 1 is not meant to show a scaled representation of such improper placement.

Figure 2:
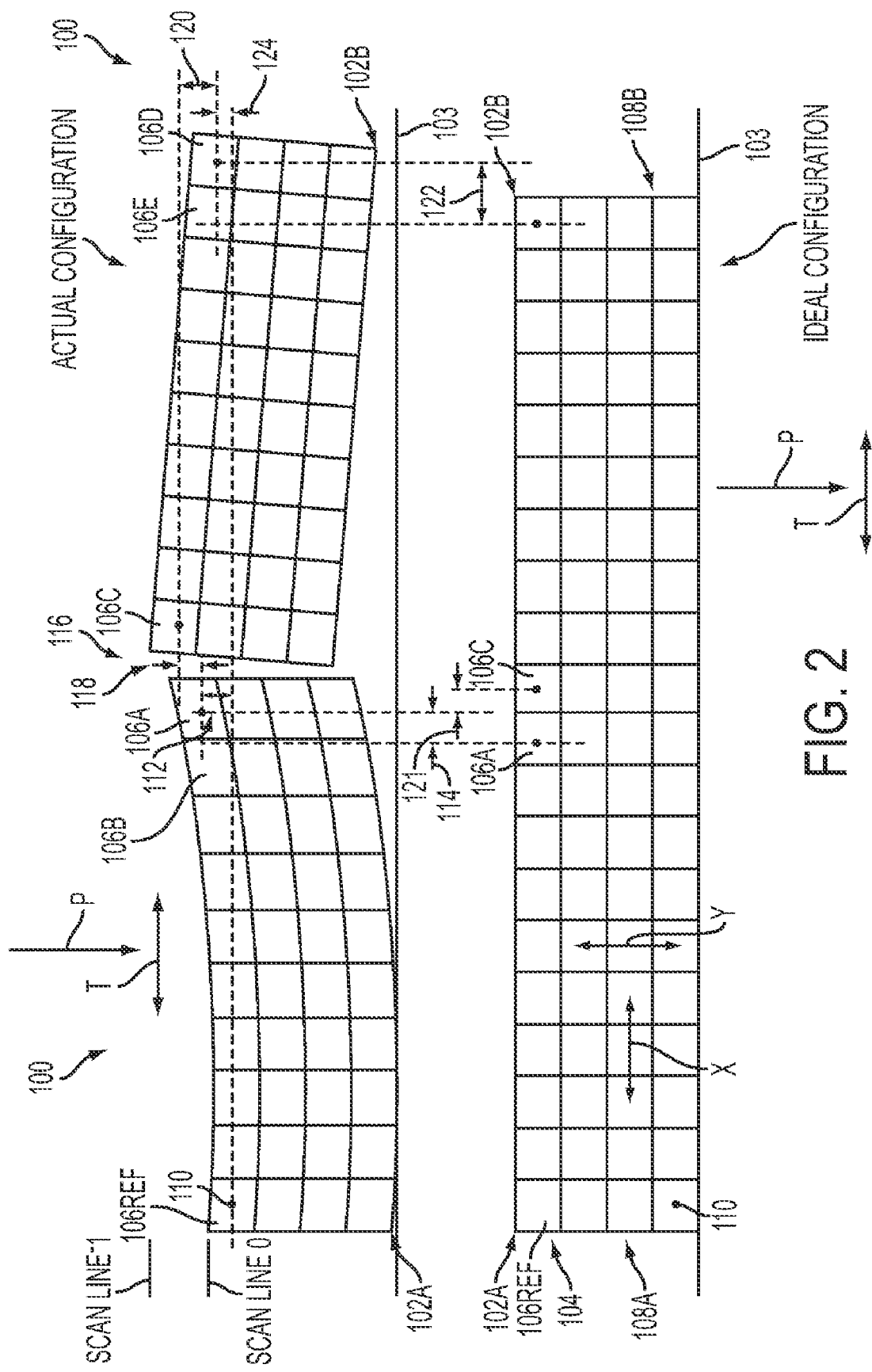
FIG. 2 is a detail of area 2 in FIG. 1 showing ideal and actual configurations for chips in the area.

FIG. 2 is a detail of area 2 in FIG. 1 showing ideal and actual configurations for chips in the area. The ideal, or desired, configuration at the bottom of the sheet assumes no optical error due to optical elements or operations, and no spatial error due to incorrect placement of chips. The ideal configuration is presented to provide a frame of reference in which to understand the discussion which follows regarding the actual configuration. Chips 102 include at least one row 104 of photosensors 106 aligned in an X direction, between ends 108A and 108B for each chip. In the ideal configuration, the X and T directions are parallel. In an example embodiment, each chip 102 includes only a single row of photosensors 106. In an example embodiment, each chip 102 includes a respective plurality of rows of photosensors 106. It should be understood that a chip is not limited to any particular number of rows of photosensors.

Photosensors 106 include respective centers 110 and can be any photosensor known in the art. In an example embodiment, the photosensors are photodiodes. In an example embodiment, chips 102 have larger number of photosensors in a row than shown in FIG. 2; however, to clarify the presentation, the number of photosensors in a row has been reduced as shown in FIG. 2. It should be understood that chip 102 is not limited to a particular number of rows of photosensors or a particular number of photosensors in a row.

To simplify the presentation, it is assumed that chip 102A has only optical error and chip 102B has only spatial error. The following discussion is directed to chip 102A and optical error. Optical errors for photosensors in a multi-chip array relate to distortions of an actual location of a photosensor due to optical operations or components, for example, a self-focusing lens. Due to inaccuracies or defects in the lens, the lens may generate data that distorts a desired location for a point or area, such as a photosensor. Optical error for a photosensor results in an apparent location different than the actual location for the photosensor. In FIG. 2, distortion due to optical error is shown by the curvature of the rows of photosensors with respect to line 103.

The processor generates $\Delta y$ optical error value 112 substantially equal to a difference in the P direction between the apparent location for a photosensor, for example, for photosensor 106A, and a desired location for the photosensor. Apparent and desired locations for photosensor 106A are shown in the ideal and actual configurations in FIG. 2, respectively. In an example embodiment, the locations are with respect to a reference point in the array, for example, the center for photosensor 106REF. The memory element stores respective outputs from the photosensors in the array for first and second scan lines, for example, scan lines 0 and −1 in FIG. 2. The actual location for photosensor 106A is included in the first scan line (0). The processor retrieves the stored output of photosensor 106A for the second scan line (−1) for use as at least part of useful image data for photosensor 106A. A choice of which first and second lines are used for correction with respect to a reference line is related to the $\Delta y$ optical error value. For example, the apparent location for photosensor 106A is at least partially included in the second scan line (−1). In an example embodiment, linear or higher order polynomial interpolation can be used to determine the useful image data. For example, in FIG. 2, interpolation could be used for data for photosensor 106A from scan lines 0 and −1.

In an example embodiment, the processor generates $\Delta x$ optical error value 114 substantially equal to a difference in the T direction, between the apparent and desired locations for photosensor 106A. In an example embodiment, the locations are with respect to a reference point in the array, for example, the center for photosensor 106REF. The memory element stores respective outputs from the photosensors in the array for one or more scan lines, for example, scan lines 0 and 1. The apparent location for photosensor 106A is included in one of the scan lines, for example, scan line 0. The processor retrieves a stored output for a second photosensor, for example, photosensor 106B, included in one of the scan lines for use as at least part of useful image data for photosensor 106A. A portion of the second photosensor is disposed, in the transverse direction, a distance approximately equal to value 114, from photosensor 106A. The discussion regarding interpolation and $\Delta y$ optical error correction is applicable to $\Delta x$ optical error correction.

The following discussion is directed to chip 102B and spatial error. In an example embodiment, the chips in the array include respective gaps between adjacent pairs of chips, for example, gap 116. The processor generates a cumulative $\Delta y$ spatial error value by summing respective $\Delta y$ spatial error values 118 for each gap between a chip, for example, chip 102B, including a photosensor, for example, photosensor 106C, and the first chip in the sequence, for example, chip 102A. A $\Delta y$ spatial error value for a gap is substantially equal to a difference in direction P between actual and desired positions for chips adjacent the gap, for example, as shown for chips 102A and 102B in the desired and actual configurations, respectively, in FIG. 2. The actual positions of the chips can be identified using any means known in the art. For example, fiduciaries (not shown) on the chips and expected distances/configurations between fiduciaries on adjacent chips can be used. A fiduciary is a marker that has a predetermined and known location on a chip. In an example embodiment, the positions are with respect to a reference point in the array, for example, the center for photosensor 106REF. In FIG. 2, $\Delta y$ spatial error value 118 for gap 116 is shown as the distance in the P direction between centers for photosensors 106A and 106C. Since only one gap is shown in FIG. 2, the cumulative $\Delta y$ spatial error value for chip 102B is equal to $\Delta y$ spatial error value 118 for gap 116.

The memory element stores respective outputs for the photosensors in the array for first and second scan lines, for example, scan lines 0 and −1. At least a portion of the desired position of photosensor 106C is included in the first scan line (0). The processor retrieves a stored output of photosensor 106C for the second scan line (−1) for use as at least part of useful image data for photosensor 106C. A choice of which first and second lines are used for correction with respect to a reference line is related to the cumulative $\Delta y$ spatial error value. For example, scan line −1 is selected so that the actual location for photosensor 106C is at least partially included in scan line −1.

In an example embodiment, the processor determines chip $\Delta y$ spatial error value 120 substantially equal to a distance, in the P direction, between photosensors at opposite longitudinal ends of a row of photosensors, for example, photosensors 106C and 106D. The processor apportions the cumulative $\Delta y$ spatial error value in chip 102B according to the chip $\Delta y$ spatial error value. For example, if the chip includes a certain number of photosensors in a row, the cumulative $\Delta y$ spatial error value can be apportioned as multiples of the chip $\Delta y$ spatial error value divided by the certain number. The discussion regarding interpolation and $\Delta y$ optical error is applicable to cumulative $\Delta y$ spatial error.

In an example embodiment, the processor generates $\Delta x$ spatial error value 121 by summing respective $\Delta x$ error values for gaps between a chip including the first photosensor and the first chip in a manner similar to that described for a cumulative $\Delta y$ error value.

In an example embodiment, the processor generates a cumulative error value for a first photosensor, for example, photosensor 106D. The cumulative error value includes difference 122 in the T direction and difference 124 in the P direction with respect to a reference point, in the array, for example, photosensor 106REF, and a location of photosensor 106D. The location is related to one or both of optical error for photosensor 106D or spatial error in placement of the chip including photosensor 106D. In an example embodiment, the cumulative error value is stored in the memory element. The memory element stores respective outputs from the photosensors in the array for first and second scan lines, for example, scan lines 0 and −1. At least a portion of the desired location of photosensor 106D is included in the first scan line (0). A choice of which first and second lines are used for correction with respect to a reference line is related to the cumulative error value. The processor retrieves, for use as at least part of useful image data for photosensor 106D, a stored output of photosensor 106D for the second scan line (−1); or a stored output of a second photosensor, for example, photosensor 106E, for the first or second scan line. In FIG. 2, image data for photosensor 106D from scan line −1 is applicable to difference 124 and image data for photosensor 106E from scan line −1 is applicable to difference 122.

In an example embodiment, the processor generates some or all of a respective $\Delta y$ optical error value, a respective $\Delta x$ optical error value, and a respective cumulative error value for each photosensor in the array. In an example embodiment, the respective error values are stored in the memory element. In an example embodiment, the respective cumulative error values are generated for more than one but less than all of the photosensors in the array.

In an example embodiment, optical or spatial error is identified using any means known in the art. In an example embodiment, the optical error of the sensor is determined during testing, for example, final testing, of the sensor, by the scanning and processing of a well-defined test pattern. In an example embodiment, a complete pixel by pixel array or a partial 2D optical error array is stored in memory in the sensor or in an apparatus including the sensor. In an example embodiment, an averaging algorithm is used during final test. In an example embodiment, high precision line pair patterns, preferably at a slight angle to prevent any aliasing or other problems, are scanned during the sensor final test to determine spatial error in each direction, for each pixel. This information is stored in memory since it will not change after module assembly. The same information could be obtained with some precision scanning light source. In an example embodiment, spatial placement errors are determined during system set-up and stored in memory at that time. In an example embodiment, sensor 100 includes memory 109 and the memory operations described supra can be implemented using memory 109 or 206.

As noted supra, according to aspects illustrated herein, there is provided a method of processing image data from a multi-chip array, with respect to $\Delta x$ optical error, using a processor in at least one specially programmed computer. In an example embodiment, the processor interpolates the respective stored outputs for the first and second photosensors for use as useful image data for the first photosensor. In an example embodiment, the at least one scan line includes first and second scan lines and the first photosensor is included in the first scan line. The processor generates a $\Delta y$ optical error value substantially equal to a difference in a process direction, orthogonal to the transverse direction, between the actual location and the apparent location, and retrieves a stored output of the first photosensor for the second scan line for use as at least part of useful image data for the first photosensor. A choice of which first and second lines are used for correction with respect to a reference line is related to the $\Delta y$ optical error value. In an example embodiment, each chip includes a respective plurality of rows of photosensors.

As noted supra, according to aspects illustrated herein, there is provided a method of processing image data from a multi-chip array, with respect to $\Delta y$ optical error, using a processor in at least one specially programmed computer. In an example embodiment, the processor interpolates the stored outputs of the first photosensor for the first and second scan lines for use as useful image data for the first photosensor. In an example embodiment, the processor generates a $\Delta x$ optical error value substantially equal to a difference in the transverse direction between the apparent and actual locations for the first photosensor; and retrieves a stored output of a second photosensor for the first or second scan line for use as at least part of useful image data for the first photosensor. A portion of the second photosensor disposed, in the transverse direction, a distance approximately equal to the $\Delta x$ optical error value, from the first photosensor. In an example embodiment, each chip includes a respective plurality of rows of photosensors.

As noted supra, according to aspects illustrated herein, there is provided a method of processing image data from a multi-chip array, with respect to $\Delta y$ spatial error, using a processor in at least one specially programmed computer. In an example embodiment, the processor determines a chip $\Delta y$ spatial error value substantially equal to a distance, in the process direction, between respective photosensors at opposite longitudinal ends of the row of photosensors; and apportions the cumulative $\Delta y$ spatial error value in the chip according to the chip $\Delta y$ spatial error value. In an example embodiment, each chip includes a respective plurality of rows of photosensors.

As noted supra, according to aspects illustrated herein, there is provided a method of processing image data from a multi-chip array, with respect to cumulative error, using a processor in at least one specially programmed computer. In an example embodiment, the array includes a sensor memory element; and generating the cumulative error value includes: storing, in the memory element or the sensor memory element, the location for the first photosensor; testing the array to determine the respective differences in the transverse and process directions; and storing, in the memory element or the sensor memory element, the respective differences in the transverse and process directions. In an example embodiment, each chip includes a respective plurality of rows of photosensors. In an example embodiment, the processor generates a respective cumulative error value for each photosensor in the array, the respective cumulative error values including respective differences in the transverse and process directions with respect to the reference point in the array and a respective location of said each photosensor, the respective locations related to respective optical error for said each photosensor or to respective spatial error in placement of a chip including said each photosensor.

Although in the discussion supra, a stored output of a single photosensor is retrieved for use as at least part of useful image data for another photosensor, it should be understood that respective stored outputs of more than one photosensor can be retrieved for use as at least part of useful image data for another photosensor.

Although certain sequences have been described supra, it should be understood that according to aspects illustrated herein, other sequences are possible. For example, any combination of $\Delta y$ optical or spatial errors, $\Delta x$ optical or spatial errors, or cumulative errors is possible. Interpolation is applicable to any combination of $\Delta y$ optical or spatial errors, $\Delta x$ optical or spatial errors, or cumulative errors.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A method of processing image data from a multi-chip array, the array including a plurality of photosensitive chips placed end to end substantially in a transverse direction, each chip in the plurality of chips including a respective row of photosensors aligned in an x direction between respective ends for said each chip, comprising:

generating, using a processor for at least one specially programmed computer, a $\Delta x$ optical error value substantially equal to a difference in the transverse direction, between an apparent location for a first photosensor and an actual location for the first photosensor, the apparent location due to optical error;

storing, in a memory element for the at least one specially programmed computer, respective outputs from the photosensors in the array for a scan line, the apparent location included in the scan line; and, retrieving, using the processor, a stored output for a second photosensor included in the scan line for use as at least part of useful image data for the first photosensor, a portion of the second photosensor disposed, in the transverse direction, a distance approximately equal to the $\Delta x$ optical error value, from the first photosensor.

2. The method of claim 1 further comprising interpolating, using the processor, the respective stored outputs for the first and second photosensors for use as useful image data for the first photosensor.

3. The method of claim 1 wherein:

the at least one scan line includes first and second scan lines; and, the first photosensor is included in the first scan line, the method further comprising:

generating, using the processor, a $\Delta y$ optical error value substantially equal to a difference in a process direction, orthogonal to the transverse direction, between the actual location and the apparent location; and, retrieving, using the processor, a stored output of the first photosensor for the second scan line for use as at least part of useful image data for the first photosensor, a choice of which first and second lines are used for correction with respect to a reference line is related to the $\Delta y$ optical error value.

4. The method of claim 1 wherein said each chip includes a respective plurality of rows of photosensors.

5. A method of processing image data from a multi-chip array, the array including a plurality of photosensitive chips placed end to end substantially in a traverse direction, each chip in the plurality of chips including a respective row of photosensors aligned in an x direction between respective ends for said each chip, comprising:

generating, using a processor for at least one specially programmed computer, a $\Delta y$ optical error value substantially equal to a difference in a process direction, orthogonal to the transverse direction, between an actual location for a first photosensor and an apparent location for the first photosensor, the apparent location due to optical error; and, storing, in a memory element for the at least one specially programmed computer, respective outputs from the photosensors in the array for first and second scan lines, wherein the actual location is included in the first scan line; and the method further comprising retrieving, using the processor, the stored output of the first photosensor for the second scan line for use as at least part of useful image data for the first photosensor, a choice of which first and second lines are used for correction with respect to a reference line is related to the $\Delta y$ optical error value.

6. The method of claim 5 further comprising interpolating, using the processor, the stored outputs of the first photosensor for the first and second scan lines for use as useful image data for the first photosensor.

7. The method of claim 5 further comprising:
generating, using the processor, a $\Delta x$ optical error value substantially equal to a difference in the transverse direction between the apparent and actual locations for the first photosensor; and,
retrieving, using the processor, a stored output of a second photosensor for the first or second scan line for use as at least part of useful image data for the first photosensor, a portion of the second photosensor disposed, in the transverse direction, a distance approximately equal to the $\Delta x$ optical error value, from the first photosensor.

8. The method of claim 5 wherein said each chip includes a respective plurality of rows of photosensors.

9. A method of processing image data from a multi-chip array, the array including a plurality of photosensitive chips placed end to end in sequence substantially in a transverse direction starting with a first chip, and forming respective gaps between adjacent pairs of chips, and each chip in the plurality of chips including a respective row of photosensors aligned in an x direction between respective longitudinal ends for said each chip, comprising:
generating, using a processor for at least one specially programmed computer, a cumulative $\Delta y$ spatial error value by summing respective $\Delta y$ spatial error values for each gap between a chip including a photosensor and the first chip in the sequence, a $\Delta y$ spatial error value for a gap substantially equal to a difference in a process direction, orthogonal to the transverse direction, between respective desired positions for chips adjacent the gap and respective actual positions between the chips adjacent the gap;
storing, in a memory element for the at least one specially programmed computer, respective outputs for the photosensors in the array for first and second scan lines, at least a portion of a location of the photosensor in the chip in the desired position included in the first scan line; and,
retrieving, using the processor, a stored output of the photosensor for the second scan line for use as at least part of useful image data for the first photosensor, a choice of which first and second lines are used for correction with respect to a reference line is related to the cumulative $\Delta y$ spatial error value.

10. The method of claim 9 further comprising:
determining, using the processor, a chip $\Delta y$ spatial error value substantially equal to a distance, in the process direction, between respective photosensors at opposite longitudinal ends of the row of photosensors; and,
apportioning the cumulative $\Delta y$ spatial error value in the chip according to the chip $\Delta y$ spatial error value.

11. The method of claim 9 wherein said each chip includes a respective plurality of rows of photosensors.

12. A method of processing image data from a multi-chip array, the array including a plurality of photosensitive chips placed end to end in sequence substantially in a transverse direction starting with a first chip, and forming respective gaps between adjacent pairs of chips, and each chip in the plurality of chips including a respective row of photosensors aligned in an x direction between respective longitudinal ends for said each chip, comprising:
generating, using a processor for at least one specially programmed computer, a cumulative error value for a first photosensor, the cumulative error value including respective differences in the transverse direction and in a process direction, orthogonal to the transverse direction, with respect to a reference point in the array and a location of the first photosensor, the location related to optical error or to spatial error in placement of a chip including the first photosensor;
storing, in a memory element for the at least one specially programmed computer, respective outputs from the photosensors in the array for first and second scan lines, the location of the first photosensor included in the first scan and a choice of which first and second lines are used for correction with respect to a reference line is related to the cumulative error value; and,
retrieving, using the processor, for use as at least part of useful image data for the first photosensor:
a stored output of the first photosensor for the second scan line; or,
a stored output of a second photosensor for the first or second scan line.

13. The method of claim 12 wherein:
the array includes a sensor memory element; and,
generating the cumulative error value includes:
storing, in the memory element or the sensor memory element, the location for the first photosensor;
testing the array to determine the respective differences in the transverse and process directions; and,
storing, in the memory element or the sensor memory element, the respective differences in the transverse and process directions.

14. The method of claim 12 wherein said each chip includes a respective plurality of rows of photosensors.

15. The method of claim 12 further comprising generating, using the processor, a respective cumulative error value for each photosensor in the array, the respective cumulative error values including respective differences in the transverse and process directions with respect to the reference point in the array and a respective location of said each photosensor, the respective locations related to respective optical error for said each photosensor or to respective spatial error in placement of a chip including said each photosensor.

16. An apparatus for generating or reproducing a document, comprising:
a multi-chip array, the array including a plurality of photosensitive chips placed end to end in substantially a transverse direction, each chip in the plurality of chips including a respective row of photosensors aligned in an x direction between respective ends for said each chip;
a processor for at least one specially programmed computer for generating a cumulative error value for a first photosensor in the array, the cumulative error value including respective differences in the transverse direction and in a process direction, orthogonal to the transverse direction, between a reference point in the array and a location of the first photosensor, the location related to optical error or to spatial error in placement of a chip including the first photosensor; and,
a memory element for the at least one specially programmed computer for storing respective outputs for the first photosensor and a second photosensor in the array, the first and second photosensors in first and second scan lines, respectively, and a choice of which first and second lines are used for correction with respect to a reference line is related to the cumulative error value, wherein the processor is for retrieving, for use as at least part of useful image data for the first photosensor:

a stored output of the first photosensor for the second scan line; or, a stored output of the second photosensor for the first or second scan line.

17. The apparatus of claim 16 wherein:
the array includes a sensor memory element;
the memory element or the sensor memory element is for storing the location for the first photosensor;
the processor is for testing the array to determine the respective differences in the transverse and process directions; and,
the memory element or the sensor memory element is for storing the respective differences in the transverse and process directions.

18. The apparatus of claim 16 wherein said each chip includes a respective plurality of rows of photosensors.

19. The apparatus of claim 16 wherein the processor is for generating a respective cumulative error value for each photosensor in the array, the respective cumulative error values including respective differences in the transverse and process directions with respect to the reference point in the array and a respective location of said each photosensor, the respective locations related to respective optical error for said each photosensor or to respective spatial error in placement of a chip including said each photosensor.

* * * * *